UNITED STATES PATENT OFFICE.

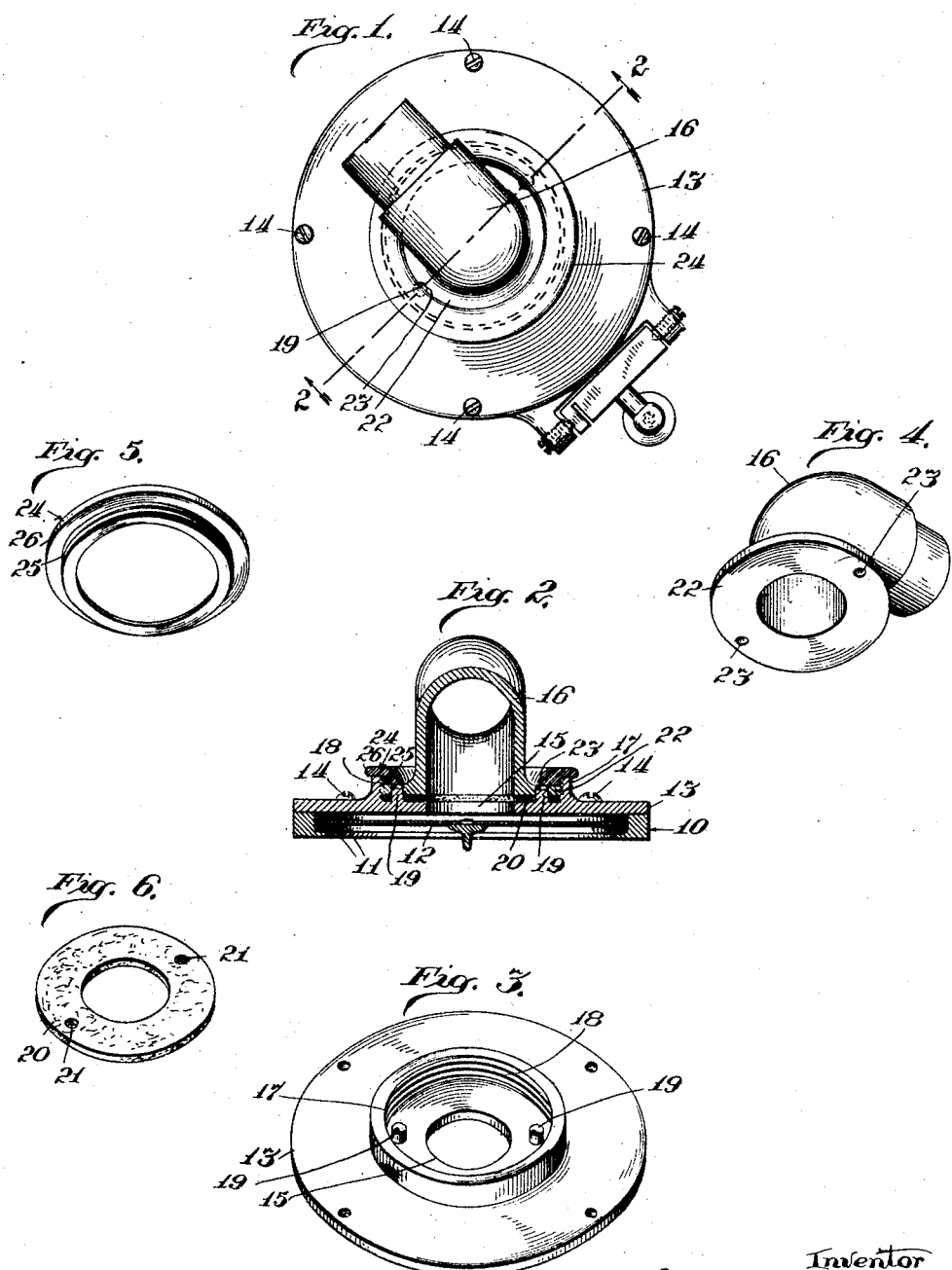

BURR B. BLOOD, OF CHICAGO, ILLINOIS.

REPRODUCER FOR PHONOGRAPHS.

1,365,298.  Specification of Letters Patent.  Patented Jan. 11, 1921.

Application filed April 21, 1919. Serial No. 291,628.

*To all whom it may concern:*

Be it known that I, BURR B. BLOOD, a citizen of the United States, and a resident of Chicago, in the county of Cook and State of Illinois, have invented certain new and useful Improvements in Reproducers for Phonographs, of which the following is a description, reference being had to the accompanying drawing, which forms a part of my specification.

My invention relates more particularly to the construction of the reproducer shell or back and means for providing a connection between the reproducer and the tone arm of a phonograph; and has for its object the provision of a construction whereby a connection between the reproducer and tone arm may not only be quickly effected, but a connection provided which will be free from the serious objections heretofore encountered because of the tendency of such connections to loosen and therefore producing improper noises or vibrations during the operation of the phonograph.

An object of my invention is to provide means whereby the proper relation between the tone arm and reproducer will be insured and the connection easily and quickly provided without the possibility of such connection to cause any chatter or vibration between the parts; the means enabling the connection to be made by the manipulation of a single element after the respective parts have been properly assembled; thus obviating the necessity for the use of a plurality of screws, or the like, which have heretofore been generally employed.

The construction and its advantages will be readily comprehended from the following detailed description of the drawing wherein:—

Figure 1 is a rear elevation of a reproducer provided with my invention.

Fig. 2 is a cross-sectional view taken on the line 2—2 of Fig. 1 looking in the direction of the arrows.

Fig. 3 is a perspective view of the rear or back wall of the reproducer.

Fig. 4 is a perspective view of the tone arm connection.

Fig. 5 is a perspective view of the connection forming or locking element, while Fig. 6 is a perspective view of a type of washer or gasket that may be employed in my improved construction.

The exemplification disclosed in the drawing I believe to be the simplest and best embodiment of my invention; but the invention may have expression in somewhat different mechanical form without departing from the spirit thereof. In the specific illustration, the reproducer shell or casing, indicated at 10 in Fig. 2, is shown of suitable depth or width to properly house the usual rubber rings or gaskets 11 between which the flexible diaphragm 12 is mounted and held in place; the gasket or ring 11 toward the front side of the shell or casing being in contact with an inwardly disposed flange on the shell or casing in the usual manner. After the diaphragm 12 and flexible holding means or members 11 have been properly assembled and placed in the shell or casing 10, the back 13 is then put into place and secured in any suitable manner as for example by means of suitable screws 14, see Fig. 1. The back 13 is provided with a central outlet or opening 15 through which the vibrations are permitted to pass from the reproducer-shell into the tone-arm by means of the tone arm connection or elbow 16, see Figs. 1, 2 and 4.

At a distance removed from the opening 15 in the back 13 and on the outer face of the back, I provide a preferably circular flange 17 shown formed integral with the back, as shown in Figs. 2 and 3. The inner perimeter or circumference of the flange 17 is provided with suitable screw-threads as at 18, see Fig. 3. As more clearly shown in Fig. 3, the flange 17 is made of considerably greater diameter than that of the opening or aperture 15 in the back 13, thus leaving a portion of the metal or back intermediate of the flange 17 and the aperture or opening 15, see Fig. 3. This intermediate portion of the back is preferably provided at diametrically opposite points with a pair of pins or studs 19, 19 disposed at points intermediate of the opening 15 and the flange 17.

In Fig. 6, I show a gasket 20 of suitable material, such as rubber or other flexible non-metallic material, and of configuration corresponding with the portion of the back intermediate of opening 15 and the circumferential flange 17; that is to say a gasket which will be disposed in a flat manner on the back 13 about the opening 15 and within the flange 17; the gasket being, of course, provided with a central opening corresponding with the opening 15 in the back 13 so as not to interfere with the sound waves. The gasket 20 is provided with holes 21 at diametrically opposite points in order to permit the gasket to extend flush with the back 13, while the pins or studs 19 are disposed through the openings 21 of the gasket, see Fig. 2.

The tone-arm or elbow connections 16 is provided with a circumferential enlargement or flange 22 at its base, of size and width corresponding with the gasket 20 so as to permit the enlargement or flange 22 to pass within the circumferential flange 17 of back 13. The flange 22 of the elbow 16 is also provided with openings 23 at diametrically opposite points for the passage of the pins or studs 19, which protrude through the openings 21 of the gasket 20.

After the gasket 20 and tone-arm connection member or elbow 16 have been assembled on the back 13 of the reproducer, as just described, I slip the locking member or element 24, shown in perspective in Fig. 5, over the small end of the connection or elbow 16, with the threaded portion 25 of element 24 disposed toward the back 13 of the reproducer. The locking member or element 24 is in the nature of a ferrule or ring with one side or margin thereof provided with the outwardly disposed flange portion 26 whereby the locking member or element may be manipulated and at the same time provide a finished appearance for the assembled construction. The threaded portion 25 of element 24 is adapted to screw into the internally threaded portion 18 of circumferential flange 17 and therefore come into contact with the enlarged end or flange 22 of the tone-arm connection or elbow 16; while the flange portion 26 may overlap the flange 17 as more clearly shown in Fig. 2.

As is evident from the construction, by screwing locking member or element 24 into the circumferential flange 17, the element 24 will force the tone-arm connection member or elbow 16 into firm relation with the gasket 20 and cause the connection or elbow 16 and reproducer-back 13 to be firmly held together so as to prevent any vibration or possible "chatter" between the parts and therefore preventing any possibility of the parts becoming loosened during use or manipulation of the reproducer. The pins or studs 19 will induce a proper positioning of the parts in the assembling thereof and the gasket or washer 20 will insure a tight relation between the tone-arm or connection elbow 16 and the reproducer and compensate for any slight inaccuracies or unevenness that may exist in the respective metal portions.

My improved construction permits the respective parts to be easily assembled and readily locked in place through the manipulation of a single locking element or holding member, whereby a firm relation between the respective elements will at all times be insured and any possibility of screws or parts becoming loosened will be entirely prevented, so that any chance of "chatter" or vibration will be eliminated.

What I claim and wish to secure by Letters Patent is:

In a reproducer, a back provided with a sound outlet and with an internally threaded circumferential flange formed integral with said back at a distance removed from said outlet, pins or studs secured to said back intermediate of said flange and said outlet, a tone-arm connection or elbow provided with an outwardly disposed flange at one end having apertures adapted to register with said studs or pins on the reproducer-back, and an externally threaded member adapted to pass over said tone-arm connection or elbow and have threaded engagement with the internally threaded flange on the reproducer-back.

BURR B. BLOOD.

Witnesses:
F. A. FLORELL,
N. A. STREET.